US012792994B2

(12) United States Patent
Singh et al.

(10) Patent No.: US 12,792,994 B2
(45) Date of Patent: Nov. 10, 2026

(54) METHOD AND SYSTEM FOR PREDICTING ORDER DELAY

(71) Applicant: Wipro Limited, Bangalore (IN)

(72) Inventors: Mahender Singh, New Delhi (IN); Vidisha Uniyal Das, Assam (IN); Priyanka Verma, Rajasthan (IN); Ashish Kumar Gupta, Ghaziabad (IN)

(73) Assignee: WIPRO LIMITED, Bangalore (IN)

( * ) Notice: Subject to any disclaimer, the term of this patent is extended or adjusted under 35 U.S.C. 154(b) by 164 days.

(21) Appl. No.: 18/394,961

(22) Filed: Dec. 22, 2023

(65) Prior Publication Data

US 2025/0139557 A1 May 1, 2025

(30) Foreign Application Priority Data

Oct. 27, 2023 (IN) ............................ 202341073388

(51) Int. Cl.

*G06Q 10/0637* (2023.01)
*G06Q 10/0631* (2023.01)
*G06Q 10/0833* (2023.01)

(52) U.S. Cl.

CPC . *G06Q 10/06375* (2013.01); *G06Q 10/06315* (2013.01); *G06Q 10/0833* (2013.01)

(58) Field of Classification Search

CPC ................ G06Q 10/063; G06Q 10/08; G06Q 10/06375; G06Q 10/06315; G06Q 10/0833; G06Q 30/0635

See application file for complete search history.

(56) References Cited

U.S. PATENT DOCUMENTS 10,713,706 B1 7/2020 Thankachan et al.
2015/0302347 A1* 10/2015 Fredette ................ G06Q 50/12 705/15

(Continued)

FOREIGN PATENT DOCUMENTS

WO 2021135212 A1 7/2021

OTHER PUBLICATIONS

K. L. Keung et al., "A Machine Learning Predictive Model for Shipment Delay and Demand Forecasting for Warehouses and Sales Data," 2021 IEEE International Conference on Industrial Engineering and Engineering Management (IEEM), Singapore, Singapore, 2021, pp. 1010-1014.*

(Continued)

*Primary Examiner* — Timothy Padot
(74) *Attorney, Agent, or Firm* — Finnegan, Henderson, Farabow, Garrett & Dunner, LLP

(57) ABSTRACT

Embodiments of present disclosure relates to method and predicting system for predicting first and second order delay. The predicting system receives order data for plurality of stages of order from sources and determines stage-wise cycle time for each of the plurality of previous stages of order by processing order data. Further, the predicting system selects model from plurality of models for either first order delay or second order delay for each of the plurality of stages of order based on output accuracy of each of the plurality of models. Thereafter, the predicting system predicts probability for either first order delay or second order delay based on selected model for each of the plurality of stages of order. Thus, the present disclosure predicts if order is delayed or severely delayed and takes necessary action to overcome the delay.

9 Claims, 6 Drawing Sheets

(56) References Cited

U.S. PATENT DOCUMENTS

| | | | |
|---|---|---|---|
| 2016/0292610 A1 | 10/2016 | Sapre et al. | |
| 2016/0300171 A1* | 10/2016 | Boldrin | G06Q 10/06315 |
| 2017/0060792 A1* | 3/2017 | Kesler | G06F 9/4881 |
| 2020/0342398 A1* | 10/2020 | Aggarwal | G06Q 10/0838 |
| 2024/0281814 A1* | 8/2024 | Panikkar | G06Q 10/0875 |

OTHER PUBLICATIONS

Y. Wang et al., "Delay Aware Dynamic Risk Assessment for Logistics Delivery," 2021 IEEE International Symposium on Systems Engineering (ISSE), Vienna, Austria, 2021, pp. 1-8.*

M. A. Zaghdoudi et al., "Predictive Analysis Methodology for Industrial Systems: Application in Supplier Delays Prediction," 2022 IEEE Information Technologies & Smart Industrial Systems (ITSIS), Paris, France, 2022, pp. 1-6.*

H. Abouloifa et al., "Predicting late delivery in Supply chain 4.0 using feature selection: a machine learning model," 2022 5th International Conference on Advanced Communication Technologies and Networking (CommNet), Marrakech, Morocco, 2022, pp. 1-5.*

P. Burggräf et al., "Machine Learning-Based Prediction of Missing Components for Assembly—a Case Study at an Engineer-to-Order Manufacturer," in IEEE Access, vol. 9, pp. 105926-105938, 2021.*

Balakrishnan et al., "An Empirical Study of Time Allotment and Delays in E-Commerce Delivery." SSRN Electronic Journal, https://doi.org/10.2139/ssrn.4120737, Jun. 8, 2022, 14 pages.

* cited by examiner

| | Order Id | Order Delay Probability | Order Id | Severe Order Delay Probability |
|---|---|---|---|---|
| **Stage 2 Output** | A | 0.4 | C | 0.4 |
| | B | 0.8 | D | 0.7 |
| | **Order Id** | **Order Delay Probability** | **Order Id** | **Severe Order Delay Probability** |
| **Stage 3 Output** | E | 0.3 | G | 0.2 |
| | F | 0.5 | H | 0.9 |
| | **Order Id** | **Order Delay Probability** | **Order Id** | **Severe Order Delay Probability** |
| **Stage 4 Output** | I | 0.5 | K | 0.1 |
| | J | 0.6 | L | 0.8 |
| | **Order Id** | **Order Delay Probability** | **Order Id** | **Severe Order Delay Probability** |
| **Stage 5 Output** | M | 0.4 | O | 0.7 |
| | N | 0.6 | P | 0.2 |
| | **Order Id** | **Order Delay Probability** | **Order Id** | **Severe Order Delay Probability** |
| **Stage 6 Output** | Q | 0.6 | S | 0.8 |
| | R | 0.8 | T | 0.9 |

| Stage | Order Id | Order Delay Probability | Severe Order Delay Probability |
|---|---|---|---|
| Stage 2 | A | 0.4 | |
| Stage 2 | B | 0.8 | |
| Stage 2 | C | | 0.4 |
| Stage 2 | D | | 0.7 |
| Stage 3 | E | 0.3 | |
| Stage 3 | F | 0.5 | |
| Stage 3 | G | | 0.2 |
| Stage 3 | H | | 0.9 |
| Stage 4 | I | 0.5 | |
| Stage 4 | J | 0.6 | |
| Stage 4 | K | | 0.1 |
| Stage 4 | L | | 0.8 |
| Stage 5 | M | 0.4 | |
| Stage 5 | N | 0.6 | |
| Stage 5 | O | | 0.7 |
| Stage 5 | P | | 0.2 |
| Stage 6 | Q | 0.6 | |
| Stage 6 | R | 0.8 | |
| Stage 6 | S | | 0.8 |
| Stage 6 | T | | 0.9 |

Figure 3b

METHOD AND SYSTEM FOR PREDICTING ORDER DELAY

TECHNICAL FIELD

The present subject matter generally relates to order management, more particularly, but not exclusively, relates to a method and system for predicting a first order and a second order delay.

BACKGROUND

In any sector, the order management process plays a pivotal role as it encapsulates entire customer order journey from an order entry till the order delivery. Many orders breach their threshold limit for completion time and are either delayed or severely delayed. The delayed and severely delayed orders contribute to high end-to-end cycle time values. Generally, delays in order fulfilment may lead to several challenges and negative consequences for marketing, such as customer dissatisfaction, increased costs, late revenue realization, revenue loss, additional cost, and operational inefficiencies. Hence, prioritizing orders at each stage of the order journey is of paramount importance.

At present, orders are tracked in random manner throughout the order management lifecycle/process. There is no visibility of 'at risk' orders in early stages of order journey. The root cause is absence of advanced analytics for order prioritization which results in ineffective jeopardy management. Thus, all this leads to loss of revenue and additional costs that are paid to vendors due to the delay in cycle time at later stages of order management cycle. As such, there is a requirement of a mechanism that deals with this critical aspect and enables stakeholder to have a visibility on the potential orders at risk in each stage of the order management. During the entire lifecycle of the order journey, there is a logical prioritization that may be followed for enabling the stakeholders to take timely proactive measures and avoid any delays. Thus, it is essential to detect such orders at preliminary stages that are bottlenecks in terms of causing delay and contributing to a higher cycle time than what is expected by the customers.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of predicting a first order and a second order delay. The method comprises receiving an order data associated with a plurality of stages of an order from one or more sources. The method comprises determining a stage-wise cycle time of each of the plurality of previous stages of order by processing the order data corresponding to each of the plurality of stages of order. The method comprises selecting a model from a plurality of models for one of a first order delay and a second order delay for each of the plurality of stages of order based on order delay output accuracy of each of the plurality of models. The plurality of models is trained based on the order data and the stage-wise cycle time of each of the plurality of previous stages of order. Thereafter, the method comprises predicting a probability for one of the first order delay and the second order delay based on the selected model corresponding to the first order delay and the second order delay for each of the plurality of stages of order.

In an embodiment, the present disclosure relates to a predicting system for predicting an order delay. The predicting system includes a processor and a memory communicatively coupled to the processor. The memory stores processor-executable instructions, which on execution cause the processor to predict a probability for one of first order delay and second order delay. The processor is configured to receive an order data associated with a plurality of stages of an order from one or more sources. The processor is configured to determine a stage-wise cycle time of each of the plurality of previous stages of order by processing the order data corresponding to each of the plurality of stages of order. The processor is configured to select a model from a plurality of models for one of a first order delay and a second order delay for each of the plurality of stages of order based on order delay output accuracy of each of the plurality of models. The plurality of models is trained based on the order data and the stage-wise cycle time of each of the plurality of previous stages of order. Thereafter, the processor is configured to predict a probability for one of the first order delay and the second order delay based on the selected model corresponding to the first order delay and the second order delay for each of the plurality of stages of order.

In an embodiment, the present disclosure relates to a non-transitory computer readable medium including instructions stored thereon that when processed by at least one processor may cause a predicting system to receive an order data associated with a plurality of stages of an order from one or more sources. Thereafter, the instruction causes the processor to determine a stage-wise cycle time of each of the plurality of previous stages of order by processing the order data corresponding to each of the plurality of stages of order. The instruction causes the processor to select a model from a plurality of models for one of a first order delay and a second order delay for each of the plurality of stages of order based on order delay output accuracy of each of the plurality of models. The plurality of models is trained based on the order data and the stage-wise cycle time of each of the plurality of previous stages of order. Lastly, the instruction causes the processor to predict a probability for one of the first order delay and the second order delay based on the selected model corresponding to the first order delay and the second order delay for each of the plurality of stages of order.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 3A:
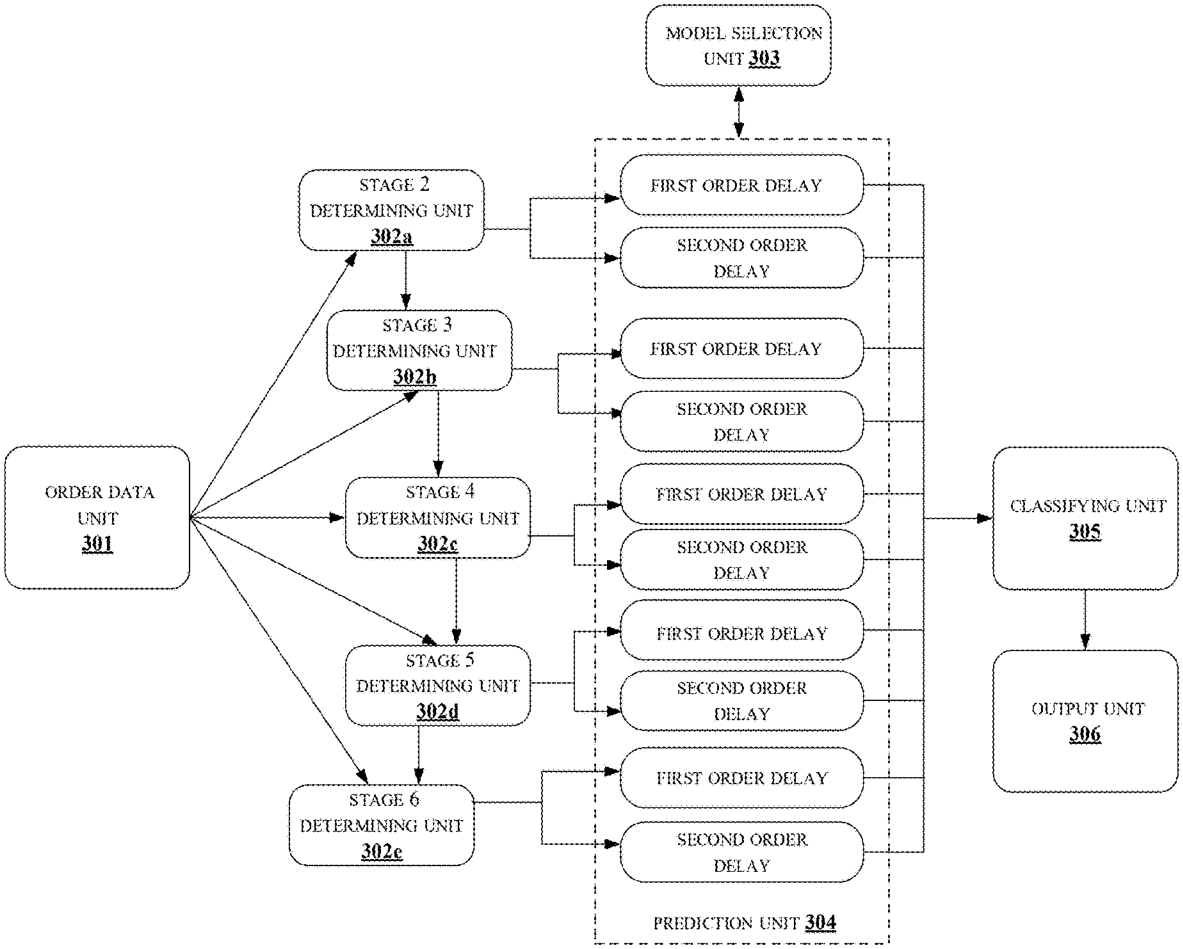
Figure 4:
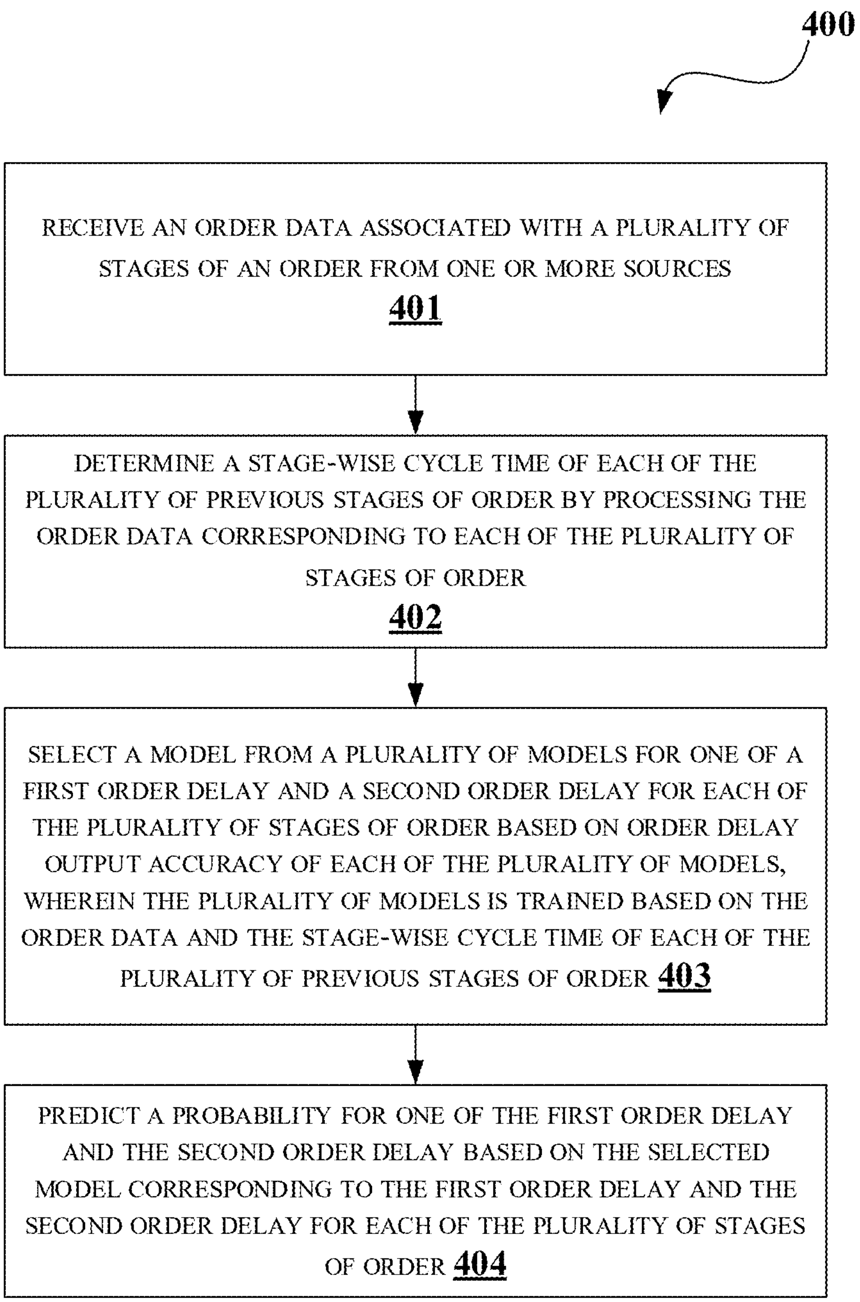
Figure 5:
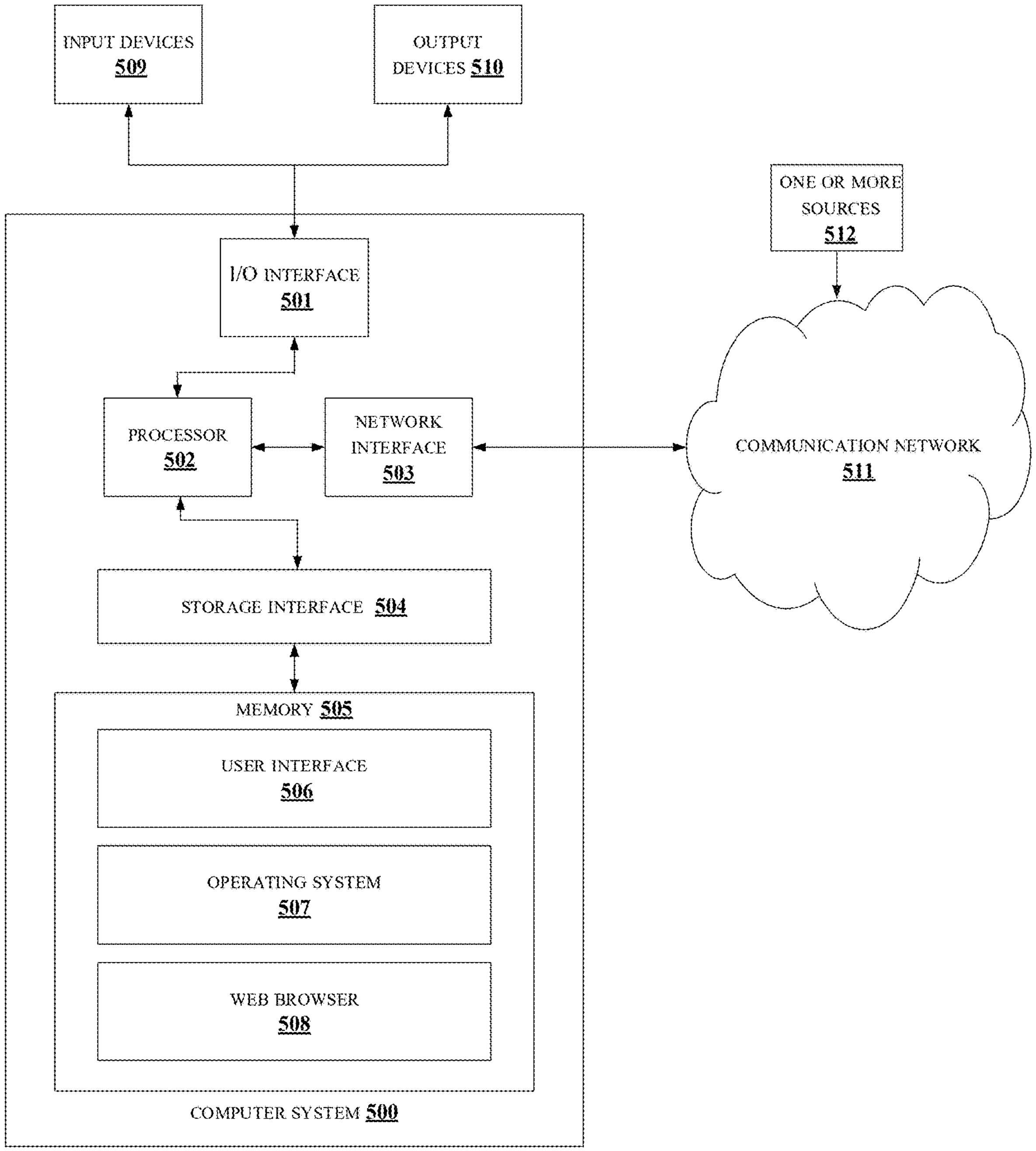

FIGS. 3*a*-3*b* show exemplary scenarios for predicting a first order and a second order delay, in accordance with some embodiments of present disclosure;

FIG. 4 illustrates a flow diagram showing exemplary method for predicting a first order and a second order delay, in accordance with some embodiments of present disclosure; and FIG. 5 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a predicting system and a method for predicting a first order and a second order delay. Currently, existing systems fails to disclose a series of delay prediction models that runs at each stage of order management journey considering additional input factors available at each stage for prediction. However, the existing systems does not disclose a multi-stage order delay prediction mechanism for predicting order delay. Thus, resulting in the loss of revenue, late revenue realization, additional cost incurrence, and effecting the customer satisfaction. The present disclosure overcomes the above problem by predicting first order and second order delay at each stage of order management considering real-time additional input factors available at each stage for prediction. The present disclosure initially receives order data for multiple stages of an order from one or more sources such as files and databases. Upon receiving, the present disclosure determines stage-wise cycle time for each of the previous multiple stages by utilising the order data. Further, the present disclosure selects a model from multiple models for order delay and severe order delay (i.e., first order delay and second order delay) based on order delay output accuracy of the multiple models. Thereafter, the present disclosure predicts probability for the order delay and severe order delay for each of the multiple stages of the order based on the selected model. Thus, the present disclosure is able to identify and flag orders at risk and saves cost and early revenue realization.

Figure 1:
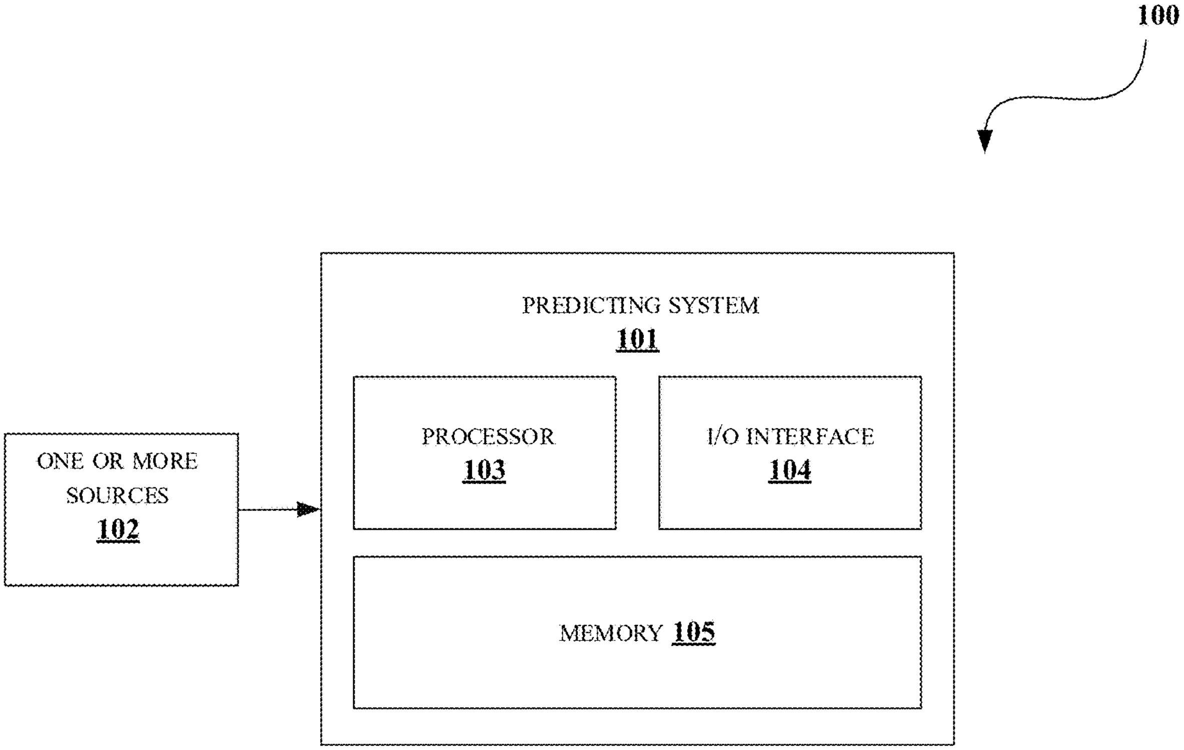
FIG. 1 shows an exemplary environment for predicting a first order and a second order delay, in accordance with some embodiments of the present disclosure.

FIG. 1 shows an exemplary environment 100 for predicting a first order and a second order delay. The exemplary environment 100 includes a predicting system 101 and one or more sources 102. In an embodiment, the one or more sources 102 may include, but is not limited to, files, tracking files, databases (i.e., external databases) and the like. In an embodiment, the predicting system 101 receives order data from the one or more sources 102. A person skilled in the art will appreciate that the one or more sources 102 may include any other source other than the above-mentioned sources for obtaining the order data. The predicting system 101 may communicate with the one or more sources 102 via a communication network (not shown explicitly in FIG. 1). Th predicting system 101 may include, but not limited to, a laptop computer, a desktop computer, a Personal Computer (PC), a notebook, a smartphone, a tablet, and the like.

Further, the predicting system 101 may include a processor 103, a I/O interface 104, and a memory 105. In some embodiments, the memory 105 may be communicatively coupled to the processor 103. The memory 105 stores instructions, executable by the processor 103, which, on execution, may cause the predicting system 101 to predict a first order and a second order delay, as disclosed in the present disclosure.

In an embodiment, the communication network may include, without limitation, a direct interconnection, Local Area Network (LAN), Wide Area Network (WAN), Controller Area Network (CAN), wireless network (e.g., using a Wireless Application Protocol), the Internet, and the like.

In an embodiment, consider that a customer places an order for delivery. In an embodiment, the order may be an order delivery of fridge. In an embodiment, consider that the order delivery comprises a plurality of stages. The plurality of stages of the order may include, but is not limited to, stage 1: order entry and validation, stage 2: vendor order placement, stage 3: vendor order delivery, stage 4: product quality assurance, stage 5: customer order delivery, stage 6: customer acceptance and order closure. The predicting system 101 receives an order data associated with the plurality of stages of an order from the one or more sources 102. The order data comprises the order identifier (ID), customer data, location data, product data, agent data, vendor data, time delay associated with each of the plurality of stages of order, start and completion date related to each of the plurality of stages of order, historical data of orders, order cycle time of historical orders, and current order data. Further, the predicting system 101 determines a stage-wise cycle time of each of the plurality of previous stages of the order by processing the order data corresponding to each of the plurality of stages of order. In an embodiment, the stage-wise cycle time of each of the plurality of previous stages of the order is determined based on a start date and a completion date related to each of the plurality of previous stages of order and delay associated with each of the plurality of previous stages of order. In an embodiment, the predicting system 101 selects a model from a plurality of models for one of a first order delay and a second order delay for each of the plurality of stages of order based on order delay output accuracy of each of the plurality of models. The plurality of models is trained based on the order data and the stage-wise cycle time of each of the plurality of previous stages of order. The plurality of models may include, but is not limited to, Logistic Regression, Decision Tree, Random Forest, and Adaptive Boosting (Extreme and Gradient) and the like. In an embodiment, the plurality of models is updated at predefined time intervals based on recent historical data. In an embodiment, the plurality of models for the first order delay and the second order delay is trained based on the historical data of orders and summation of previous stage-wise cycle time of each of the plurality of stages of order. In an embodiment, upon training, the predicting system 101 obtains the order delay output accuracy based on one of a first predefined threshold value and a second predefined threshold value. In an embodiment, the first and second predefined threshold value is used to determine whether the order should go into a model that predicts first order delay or into a model that predicts second order delay or if the order has breached the second predefined threshold value and is not sent into any model for prediction.

The predicting system 101 predicts a probability for one of the first order delay and the second order delay based on the selected model corresponding to the first order delay and the second order delay for each of the plurality of stages of the order. In an embodiment, the predicting system 101 calculates a current order age of the order based on summation of previous stage-wise cycle time of each of the plurality of stages of order. The predicting system 101 then compares if the current order age is less than and equal to the first predefined threshold value. Further, the predicting system 101 predicts the probability for the first order delay based on the selected model corresponding to the first order delay, when the current order age is less than and equal to the first predefined threshold value. In another embodiment, when the current order age is greater than the first predefined threshold value, the predicting system 101 compares if the current order age is less than and equal to second predefined threshold value. In an embodiment, the predicting system 101 predicts the probability for the second order delay based on the selected model corresponding to the second order delay, when the current order age is less than and equal to the second predefined threshold value. Further, the predicting system 101 then classifies the order into one of a risk category from one or more risk categories based on the probability of one of the first order delay and the second order delay.

Figure 2:
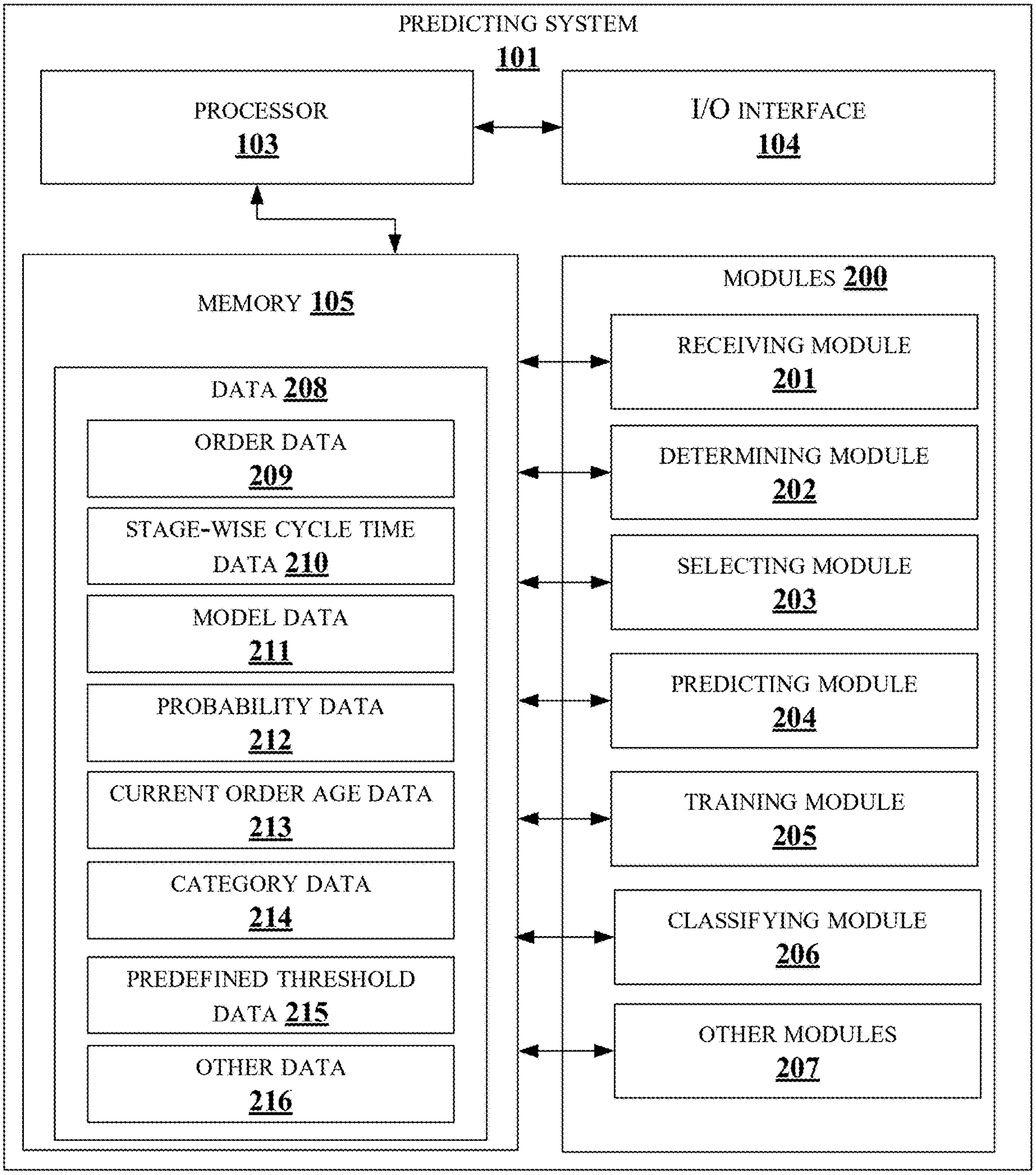
FIG. 2 shows a detailed block diagram of predicting system for predicting a first order and a second order delay, in accordance with some embodiments of the present disclosure.

FIG. 2 shows a detailed block diagram of predicting system for predicting a first order and a second order delay, in accordance with some embodiments of the present disclosure.

The predicting system 101, in addition to the I/O interface 104 and processor 103 described above, includes one or more modules 200 and data 208 in the memory 105, which is described herein in detail.

In one implementation, the one or more modules 200 may include, but are not limited to, a receiving module 201, a determining module 202, a selecting module 203, a predicting module 204, a training module 205, a classifying module 206, and other modules 207, associated with the predicting system 101.

In an embodiment, data 208 in the memory 105 may include order data 209, stage-wise cycle time data 210, model data 211, probability data 212, current order age data 213, category data 214, predefined threshold data 215, and other data 216 associated with the predicting system 101.

In an embodiment, the data 208 in the memory 105 may be processed by the one or more modules 200 of the predicting system 101. The one or more modules 200 may be configured to perform the steps of the present disclosure using the data 208, for predicting a first order delay and a second order delay. In an embodiment, each of the one or more modules 200 may be a hardware unit which may be outside the memory 105 and coupled with the predicting system 101. In an embodiment, the one or more modules 200 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSC), a combinational logic circuit, and/or other suitable components that provide the described functionality.

One or more modules 200 of the predicting system 101 function to predict a first order delay and a second order delay. The one or more modules 200 along with the data 208, may be implemented in any system, for predicting the first order delay and the second order delay.

The order data 209 may include information such as order ID, customer data, location data, product data, agent data, vendor data, time delay associated with each of the plurality of stages of order, start and completion date related to each of the plurality of stages of order, historical data of orders, order cycle time of historical orders, and current order data etc.

The stage-wise cycle time data 210 may include information regarding time taken to process the order at each of the plurality of stages of the order.

The model data 211 may include information regarding the plurality of models utilised for predicting the probability of the first order delay and the second order delay.

The probability data 212 may include information regarding the probability of first order delay and the second order delay.

The current order age data 213 may include information regarding summation of all the stage-wise cycle time of the plurality of stages of the order.

The category data 214 may include information regarding one or more categories in which the order is classified. The category data 214 may include high risk, medium risk and low risk.

The predefined threshold 215 may include information regarding the first predefined threshold value and the second predefined threshold value. The first predefined threshold value is utilised to tag an order as delayed. The second predefined threshold value is utilised to tag the order as severely delayed.

The other data 216 may store data, including temporary data and temporary files, generated by modules for performing the various functions of the predicting system 101.

The receiving module 201 of the predicting system 101 is configured to receive the order data associated with the plurality of stages of an order from the one or more sources 102. In an embodiment, the receiving module 201 receives and stores the order data such as order ID and order stage. In an embodiment, for each order, the receiving module 201 is configured to collect and stores order data parameters pertaining to customer, geography, product, agent, vendor, and intermediate delay presence across the plurality of stages of the order. The receiving module 201 also collects and stores stage-wise start and completion dates. In an embodiment, for historical orders, the receiving module 201 additionally collects and stores order cycle time (i.e., total time taken to process the order through all the plurality of stages). The order data also includes current data for real-time orders. The current order data is used to predict the probability of delay of the orders. In an embodiment, the receiving module 201 may segregate the order data as per the plurality of stages of the order. In an embodiment, the customer data includes customer name, type, preferences, committed delivery time etc. In an embodiment, the geography data (i.e., the location data) includes site city, region, country pertaining to order placement/delivery/manufacturing, geographic factors, logistics, customer behaviour etc. In an embodiment, the product data includes product category, sub-type, and feature. In an embodiment, the agent data includes agent name, team name who are processing the order. In an embodiment, the vendor data includes vendor name or type. In an embodiment, the intermediate delay data includes binary variable (Yes/No) based on presence of any intermediate delay in order processing at any stage due to vendor, customer, or company. In an embodiment, the receiving module 201 transmits the order data associated with each of the plurality of stages of the order to the determining module 202.

The determining module 202 of the predicting system 101 is configured to determine the stage-wise cycle time of each of the plurality of previous stages of the order by processing the order data corresponding to each of the plurality of stages of the order. In an embodiment, the determining module 202 is configured to pre-process the order data to ensure it is in a suitable format and quality for model training and prediction by subsequent modules. In an embodiment, the determining module 202 computes the stage-wise cycle time using start and completion date for the previous stage of order. In an embodiment, the determining module 202 determines the stage-wise cycle time of previous stage of each of the plurality of stages of the order using the data of start date and completion date of previous stage. For example, the determining module 202 computes stage 1 cycle time based on the stage 1 start and completion dates. Similarly, the determining module 202 computes the stage 2 cycle time based on the stage 2 start and completion dates. Similarly, the determining module 202 computes the stage-wise cycle time for all the plurality of stages of the order. In another embodiment, the determining module 202 may be configured to collate the processed order data and the stage-wise cycle time. For example, the determining module 202 may collate the processed order data parameters related to customer, agent, geography, product and the stage 1 cycle time using order ID. In an embodiment, for historical orders, order cycle time is also collated. Similarly, the determining module 202 may collate the processed order data parameters related to customer, agent, geography, product, vendor, and the stage 1 and stage 2 cycle times using order ID. In an embodiment, for historical orders, order cycle time is also collated. Similarly, the determining module 202 may collate the processed order data parameters related to customer, agent, geography, product, vendor, presence of intermediate delay, and the stage 1, stage 2 and stage 3 cycle times using order ID. In an embodiment, for historical orders, order cycle time is also collated. In an embodiment, the determining module 202 collates the processed order data for all the plurality of stages of the order.

The selecting module 203 of the predicting system 101 is configured to select a model from a plurality of models for either the first order delay or the second order delay for each of the plurality of stages of order based on order delay output accuracy of each of the plurality of models.

In an embodiment, the plurality of models is trained based on the order data and the stage-wise cycle time of each of the plurality of previous stages of order. In an embodiment, the training module 205 trains the plurality of models with best Area Under the Curve (AUC) of Receiver Operator Curve (ROC) at the entry of stage 2 to 6 for order delay (alternatively referred as the first order delay) and severe order delay (alternatively referred as the second order delay) prediction using the historical data. In an embodiment, the plurality of models may include Logistic Regression, Decision Tree, Random Forest, and Adaptive Boosting (Extreme and Gradient) models. In an embodiment, the training module 205 trains the plurality of models for both the first order delay and the second order delay based on the historical data. In an embodiment, input parameter for the first order delay and the second order delay at each of the plurality of stages of the order is same, but output parameter is different. In an embodiment, Cramer's V value is utilised to identify the input parameters at each of the plurality of stages of the order. In an embodiment, the output parameter for the first order delay is determined based on the first predefined threshold value, T1 while the output parameters for the second order delay are determined based on the second predefined threshold value, T2, where $T2>T1$. In an embodiment, the output parameter is categorical in nature (Yes/No) for both order delay and severe order delay. For example, for the first order delay, if the order cycle time of an order is "X" days and if $X<=T1$ then the output parameter is "No"; if $X>T1$ then the output parameter is "Yes". Similarly, for the second order delay, if the order cycle time of an order is "Y" days and if $T1<Y<=T2$, then the output parameter is "No"; if $Y>T2$ then the output parameter is "Yes".

In an embodiment, for example, if T1=105 days and T2=110 days, consider the below table 1 showing output parameter for an order.

TABLE 1

| Order ID | Order cycle time (days) | First order delay output parameter (Yes/No) | Second order delay output parameter (Yes/No) |
|---|---|---|---|
| A | 103 | No | — |
| B | 105 | No | — |
| C | 107 | Yes | No |
| D | 115 | Yes | Yes |

In an embodiment, the training module 205 uses all the order (A to D) for training the first order delay and orders C and D for training the second order delay. In an embodiment, the training module 205 trains the plurality of models for the order at stage 2 for the first order delay and the second order delay. For example, for the first order delay and the second order delay, the training module 205 utilises the input parameters as the processed order data related to customer, agent, geography, product and stage 1 cycle time. Further, the training module 205 obtains the output parameter for the first order delay as Yes/No based on the T1, the order cycle time and the output parameter for the second order delay as Yes/No based on the T2, the order cycle time as explained above. Similarly, the training module 205 trains the plurality of models for the order at stage 3 for the first order delay and the second order delay. For example, for the first order delay and the second order delay, the training module 205 utilises the input parameters as the processed order data related to customer, agent, geography, product, vendor, and stage 1, stage 2 cycle time. Further, the training module 205 obtains the output parameter for the first order delay as Yes/No based on the T1, the order cycle time and the output parameter for the second order delay as Yes/No based on the T2, the order cycle time as explained above. Similarly, the training module 205 trains the plurality of models for the order at stage 4, 5 and 6 for the first order delay and the second order delay.

In an embodiment, the training module 205 utilises a portion of the historical data (e.g., 70%) for training the plurality of models and other 30% for testing the plurality of models to obtain the order delay output accuracy of the plurality of models. In an embodiment, based on the order delay output accuracy of the plurality of models, the selection module 203 selects the model for the first order delay and the second order delay at each of the plurality of stages of the order. In an embodiment, the selecting module 203 selects the model, for each stage i.e., from stage 2 to stage 6 for the first order delay and the second order delay. Thus, the selecting model selects ten model, five for the first order delay and five for the second order delay.

In an embodiment, the selecting module 203 is configured to perform hyperparameter tuning at each of the plurality of stages of the order to identify suitable model attributes for the selected model. For example, the attributes of Random Forest Model are number of trees in random forest, number of features at each split, maximum number of levels in tree, minimum number of samples required to split a node, minimum number of samples required at each leaf node and method of selecting samples for training each tree. In an embodiment, different values of these attributes are passed through Grid Search CV technique to find optimal values for the attributes. Further, at each of the plurality of stages of the order, the five selected model for the first order delay and the five selected model for the second order delay are built using the optimal attribute values from the Grid Search CV.

The predicting module 204 of the predicting system 101 is configured to predict a probability for one of the first order delay and the second order delay based on the selected model corresponding to the first order delay and the second order delay for each of the plurality of stages of order. In an embodiment, the predicting module 204 at each of the plurality of stages of the order, utilizes the corresponding selected model and the order data for the first order delay to predict the probability i.e., probability of exceeding the first predefined threshold value T1. Similarly, the predicting module 204 at each of the plurality of stages of the order, utilizes the corresponding selected model and the order data for the second order delay to predict the probability i.e., probability of exceeding the second predefined threshold value T2.

In an embodiment, the predicting module 204 is configured to calculate the current order age of the order based on summation of previous stage-wise cycle time of each of the plurality of stages of order. For example, if the order is at stage 4 and the order has not crossed the first predefined threshold value T1, then the current order age=stage 1 cycle time+stage 2 cycle time+stage 3 cycle time. In another example, if the order is at stage 5 and the order has crossed the first predefined threshold value T1 but not second predefined threshold value T2, then the current order age=stage 1 cycle time+stage 2 cycle time+stage 3 cycle time+stage 4 cycle time. In an embodiment, the predicting module 204 computes the current order age based on summation of the stage-wise cycle time of previous stages of the plurality of stages of the order. If the current order age is less or equal to T1, the predicting module 204 predicts the probability of the first order delay using the processed order data parameters and the stage-wise cycle time. Similarly, if the current order age is greater than T1 and less than or equal to T2, the predicting model 204 predicts the probability of the second order delay using the processed order data parameters and the stage-wise cycle time. In an embodiment, the predicting module 204 may either predict the first order delay or the second order delay at each of the plurality of stages to identify if the order is delayed or severely delayed performing one or more actions. For example, see the below table 2 for predicting the probability.

TABLE 2

| Order ID | Order stage | Current order age (Ct) | Condition | Prediction model | Output probability |
|---|---|---|---|---|---|
| 111 | 2 | $Ct_{21}$ | $Ct_{21}$ <= T1 | Stage 2 - First order delay | $Pb_{21}$ |
| 222 | 3 | $Ct_{31}$ | $Ct_{31}$ <= T1 | Stage 3 - First order delay | $Pb_{31}$ |
| 333 | 3 | $Ct_{32}$ | T1 < $Ct_{32}$ <= T2 | Stage 3 - Second order delay | $Pb_{32}$ |
| 444 | 4 | $Ct_{41}$ | $Ct_{41}$ <= T1 | Stage 4 - First order delay | $Pb_{41}$ |
| 555 | 5 | $Ct_{52}$ | T1 < $Ct_{51}$ <= T2 | Stage 5 - Second order delay | $Pb_{52}$ |
| 666 | 6 | $Ct_{61}$ | $Ct_{61}$ > T2 | None | — |

In an embodiment, the classifying module 206 of the predicting system 101 is configured to classify the order into one of a risk category from one or more risk categories based on the probability of the first order delay or the second order delay. In an embodiment, the classifying module 206 utilises the probability output at each of the plurality of stages of the order and collates for both the first order delay and the second order delay to classify the order into one of the risk categories. For example, if the probability is greater than P1, the order is at high risk. If the probability is greater than P2 and less than or equal to P1, the order is at medium risk. If the probability is less than or equal to P2, the order is at low risk. In an embodiment, P1 and P2 are predefined probability threshold values, where P1>P2.

The one or more modules 200 may include other modules 207 such as a calculating module and a display module for calculating the probability and displaying the output to a user, respectively. Also, the other modules 207 may perform various miscellaneous functionalities of the predicting system 101. It will be appreciated that such modules may be represented as a single module or a combination of different modules.

FIGS. 3*a*-3*b* show exemplary scenarios for predicting a first order and a second order delay, in accordance with some embodiments of present disclosure. For example, FIG. 3*a* shows an order data unit 301, plurality of stage-wise cycle time determining unit 302 (302*a*, 302*b* . . . , 302*e*), a model selection unit 303, a prediction unit 304, a classifying unit 305 and an output unit 306. The order data unit 301 receives the order data associated with the plurality of stages of the order (i.e., stage 1 to stage 6) from the one or more sources 102. Upon receiving, the plurality of stage-wise cycle time determining unit 302 pre-process the order data and determine the stage-wise cycle time for each of the plurality of stages of the order as explained above in FIG. 2. In an embodiment, the pre-processing is performed to handle missing values, outliers, varying scales, categorial variables, high dimensionality, skewed data and facilitate appropriate data splitting. Upon determining the stage-wise cycle time, the model selection unit 303 selects a model for each of the plurality of stages of the order for either the first order delay or the second order delay as explained above in FIG. 2. Upon selecting, the prediction unit 304 predicts the probability of the first order delay or the second order delay based on the pre-processed data and the stage-wise cycle time as explained in FIG. 2. Further, the classifying unit 305 classifies the order into either, high risk, medium risk or low risk category depending on the probability value. For example, consider that the probability of the order is 0.9 and P1=0.7 and P2-0.4, as the probability is greater than the P1, the order is at high risk. Further, the output unit 306 displays the results to the user to perform one or more actions. For example, FIG. 3*b* shows the result that is displayed to the user. In an embodiment, the high-risk order may be shown in red colour, medium risk order is shown in amber colour, low risk order is shown in green colour. A person skilled in the art may understand that any colour may be used to represent the high-risk order, medium risk order and the low-risk order. In an embodiment, the order in high-risk category has highest chance of missing target deadlines, as such these orders are prioritized to work first at next stage of the order.

FIG. 4 illustrates a flow diagram showing exemplary method for predicting a first order and a second order delay, in accordance with some embodiments of present disclosure.

As illustrated in FIG. 4, the method 400 may include one or more blocks for executing processes in the predicting system 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, receiving, the order data associated with the plurality of stages of the order from one or more sources 102.

At block 402, determining, the stage-wise cycle time of each of the plurality of previous stages of the order by processing the order data corresponding to the each of the plurality of stages of the order.

At block 403, selecting, the model from the plurality of models for one of the first order delay and the second order delay for each of the plurality of stages of order based on order delay output accuracy of each of the plurality of models. The plurality of models is trained based on the order data and the stage-wise cycle time of each of the plurality of previous stages of the order.

At block 404, predicting, the probability for one of the first order delay and the second order delay based on the selected model corresponding to the first order delay and the second order delay for each of the plurality of stages of the order.

FIG. 5 illustrates a block diagram of an exemplary computer system 500 for implementing embodiments consistent with the present disclosure. In an embodiment, the computer system 500 is used to implement predicting system 101. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 may consist of the predicting system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with one or more sources 512 for predicting a first order delay and a second order delay. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browser 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft.NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for predicting if the order is delayed or severely delayed and takes necessary action to overcome the delay. The method of the present disclosure provides tracking of high-risk orders from initial stages of order journey helps in early closure of the orders.

An embodiment of the present disclosure minimises cycle time of order by identifying and flagging orders at risk and thus reducing increased cost, revenue loss, etc.

An embodiment of the present disclosure displays the results using visualization tool. Thus, providing a multi-dimensional view of order details, probability scores for order delay and associated risk. Thus, facilitating in providing a clear visibility on order status. The present disclosure also shares high risk orders that needs to be prioritized with stage leads.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. \

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral numerals:

| Reference Number | Description |
|---|---|
| 100 | Environment |
| 101 | Predicting system |
| 102 | One or more sources |
| 103 | Processor |
| 104 | I/O interface |
| 105 | Memory |
| 200 | Modules |
| 201 | Receiving module |
| 202 | Determining module |
| 203 | Selecting module |
| 204 | Predicting module |
| 205 | Training module |
| 206 | Classifying module |
| 207 | Other modules |
| 208 | Data |
| 209 | Order data |
| 210 | Stage-wise cycle time data |
| 211 | Model data |
| 212 | Probability data |
| 213 | Current order age data |
| 214 | Category data |
| 215 | Predefined threshold data |
| 216 | Other data |
| 301 | Order data unit |
| 302 (302a, 302b, 302c, 302d, 302e) | Plurality of stage-wise determining unit |
| 303 | Model selection unit |
| 304 | Prediction unit |
| 305 | Classifying unit |
| 306 | Output unit |
| 500 | Computer system |
| 501 | I/O Interface |
| 502 | Processor |
| 503 | Network interface |
| 504 | Storage interface |
| 505 | Memory |
| 506 | User interface |
| 507 | Operating system |
| 508 | Web browser |
| 509 | Input devices |
| 510 | Output devices |
| 511 | Communication network |
| 512 | One or more source |

What is claimed is:

1. A computer-implemented method for predicting a first order delay and a second order delay in an order-management workflow, the method comprising:

receiving, by a predicting system via a communication network from one or more sources, an order data associated with a plurality of stages of an order, wherein the one or more sources comprise at least one of order tracking files and databases, wherein the order data comprises an order identifier (ID), customer data, location data, product data, agent data, vendor data, time delay associated with each of the plurality of stages of order, start and completion date related to each of the plurality of stages of the order, historical order data, order cycle time of historical orders, and current order data;

segregating, by the predicting system, the order data according to the plurality of stages of the order;

determining, by the predicting system, a stage-wise cycle time of each of the plurality of previous stages of the order based on the segregated order data;

selecting, by the predicting system, one or more input parameters for each of the plurality of stages of the order based on a Cramer's V value;

training, by a training module in the predicting system, a plurality of models comprising at least one of: Logistic Regression, Decision Tree, Random Forest, and Adaptive Boosting models, using a first portion of the historical order data for training, and a second portion of the historical order data for testing to obtain order delay output accuracy, wherein the training is performed using the historical order data together with a summation of the determined stage-wise cycle time of each of the plurality of previous stages of the order;

performing, by the training module, hyperparameter tuning for each of the plurality of models at each of the plurality of stages of the order to identify model attributes;

selecting, by the predicting system, a model from a plurality of models for one of a first order delay and a second order delay for each of the plurality of stages of the order based on the order delay output accuracy of each of the plurality of models, wherein the order delay output accuracy is measured using Area Under the Curve (AUC) of the Receiver Operator Curve (ROC), such that the model with best AUC-ROC is selected for predicting the order delay;

predicting in real-time, by the predicting system, a probability for the order delay for each of the plurality of stages of the order, wherein the probability comprises one of the first order delay and the second order delay, wherein the predicting comprises:

calculating, by the predicting system, a current order age based on a summation of previous stage-wise cycle time;

comparing, by the predicting system, the current order age with a first pre-defined threshold value; and predicting, by the predicting system, a probability for the first order delay based on the selected model corresponding to the first order delay, when the current order age is less than and equal to the first pre-defined threshold value;

when the current order age is greater than the first pre-defined threshold value, comparing the current order age with a second pre-defined threshold value and predicting the probability for the second order delay when the current order age is less than or equal to the second pre-defined threshold value;

identifying, by the predicting system, one or more orders at risk based on the predicted probabilities in real-time, wherein the identifying comprising:

tagging an order as delayed based on the probability for the first order delay, and tagging the order as severely delayed based on the probability for the second order delay;

classifying, by the predicting system, the order into one of a risk category from one or more risk categories based on the probability of one of the first order delay and the second order delay in real-time; and displaying, using visualization tool, a multi-dimensional view of order details, the predicted probabilities and the associated risk category, wherein a high-risk order is indicated in red color, a medium-risk order is indicated in amber color, and a low-risk order is indicated in green color, to facilitate the user to perform one or more actions to overcome the order delay in real-time.

2. The method as claimed in claim 1, wherein the stage-wise cycle time of each of the plurality of previous stages of the order is determined based on a start date and a completion date related to each of the plurality of previous stages of the order and delay associated with each of the plurality of previous stages of the order.

3. The method as claimed in claim 1, wherein the plurality of models is updated at predefined time intervals based on recent historical data.

4. The method as claimed in claim 1, wherein the one or more input parameters comprise processed order data related to at least one of customer data, agent data, geographical data, product data, vendor data, and stage-wise cycle time corresponding to the plurality of stages of the order including stage 1 and stage 2.

5. The method as claimed in claim 1, wherein the model attributes comprise at least one of number of trees in a Random Forest model, number of features at each split, maximum number of levels in tree, minimum number of samples required to split a node, minimum number of samples required at each leaf node and method of selecting samples for training each tree.

6. A predicting system for predicting a first order and a second order delay in an order-management workflow, comprising:

a processor; and a memory communicatively coupled to the processor, wherein the memory stores processor-executable instructions, which, on execution, cause the processor to:

receive an order data associated with a plurality of stages of an order from one or more sources via a communication network, wherein the one or more sources comprise at least one of order tracking files and databases, wherein the order data comprises an order identifier (ID), customer data, location data, product data, agent data, vendor data, time delay associated with each of the plurality of stages of order, start and completion date related to each of the plurality of stages of the order, historical order data, order cycle time of historical orders, and current order data;

segregate the order data according to the plurality of stages of the order;

determine a stage-wise cycle time of each of the plurality of previous stages of the order based on the segregated order data;

select one or more input parameters for each of the plurality of stages of the order based on a Cramer's V value;

train, using a training module in the predicting system, a plurality of models comprising at least one of: Logistic Regression, Decision Tree, Random Forest, and Adaptive Boosting models, using a first portion of the historical order data for training, and a second portion of the historical order data for testing to obtain order delay output accuracy, wherein the training is performed using the historical order data together with a summation of the determined stage-wise cycle time of each of the plurality of previous stages of the order;

perform, by the training module, hyperparameter tuning for each of the plurality of models at each of the plurality of stages of the order to identify model attributes;

select a model from a plurality of models for one of a first order delay and a second order delay for each of the plurality of stages of the order based on the order delay output accuracy of each of the plurality of models, wherein the order delay output accuracy is measured using Area Under the Curve (AUC) of the Receiver Operator Curve (ROC), such that the model with best AUC-ROC is selected for predicting the order delay;

predict in real-time a probability for the order delay for each of the plurality of stages of the order, wherein the probability comprises one of the first order delay and the second order delay, wherein the predicting comprises:

calculate a current order age based on a summation of previous stage-wise cycle time;

compare the current order age with a first pre-defined threshold value; and predict a probability for the first order delay based on the selected model corresponding to the first order delay, when the current order age is less than and equal to the first pre-defined threshold value;

when the current order age is greater than the first pre-defined threshold value, compare the current order age with a second pre-defined threshold value and predicting the probability for the second order delay when the current order age is less than or equal to the second pre-defined threshold value;

identify one or more orders at risk based on the predicted probabilities in real-time, wherein the identifying comprising:

tagging an order as delayed based on the probability for the first order delay, and tagging the order as severely delayed based on the probability for the second order delay;

classify the order into one of a risk category from one or more risk categories based on the probability of one of the first order delay and the second order delay in real-time; and display, using visualization tool, a multi-dimensional view of order details, the predicted probabilities and the associated risk category, wherein a high-risk order is indicated in red color, a medium-risk order is indicated in amber color, and a low-risk order is indicated in green color, to facilitate the user to perform one or more actions to overcome the order delay in real-time.

7. The predicting system as claimed in claim 6, wherein the stage-wise cycle time of each of the plurality of previous stages of the order is determined based on a start date and a completion date related to each of the plurality of previous stages of the order and delay associated with each of the plurality of previous stages of the order.

8. The predicting system as claimed in claim 6, wherein the plurality of models is updated at predefined time intervals based on recent historical data.

9. A non-transitory computer readable medium including instruction stored thereon that when processed by at least one processor cause a predicting system to perform operation comprising:

receiving an order data associated with a plurality of stages of an order from one or more sources via a communication network, wherein the one or more sources comprise at least one of order tracking files and databases, wherein the order data comprises an order identifier (ID), customer data, location data, product data, agent data, vendor data, time delay associated with each of the plurality of stages of order, start and completion date related to each of the plurality of stages of order, historical order data, order cycle time of historical orders, and current order data;

segregating, by the predicting system, the order data according to the plurality of stages of the order;

determining a stage-wise cycle time of each of the plurality of previous stages of the order based on the segregated order;

selecting one or more input parameters for each of the plurality of stages of the order based on a Cramer's V value;

training, using a training module in the predicting system, a plurality of models comprising at least one of: Logistic Regression, Decision Tree, Random Forest, and Adaptive Boosting models, using a first portion of the historical order data for training, and a second portion of the historical order data for testing to obtain order delay output accuracy, wherein the training is performed using the historical order data together with a summation of the determined stage-wise cycle time of each of the plurality of previous stages of the order;

performing, by the training module, hyperparameter tuning for each of the plurality of models at each of the plurality of stages of the order to identify model attributes;

selecting a model from a plurality of models for one of a first order delay and a second order delay for each of the plurality of stages of the order based on the order delay output accuracy of each of the plurality of models, wherein the order delay output accuracy is measured using Area Under the Curve (AUC) of the Receiver Operator Curve (ROC), such that the model with best AUC-ROC is selected for predicting the order delay;

predicting in real-time a probability for the order delay for each of the plurality of stages of the order, wherein the probability comprises one of the first order delay and the second order delay, wherein the predicting comprises:

calculating a current order age based on a summation of previous stage-wise cycle time;

comparing, by the predicting system, the current order age with a first pre-defined threshold value; and predicting a probability for the first order delay based on the selected model corresponding to the first order delay, when the current order age is less than and equal to the first pre-defined threshold value;

when the current order age is greater than the first pre-defined threshold value, comparing the current order age with a second pre-defined threshold value and predicting the probability for the second order delay when the current order age is less than or equal to the second pre-defined threshold value;

identifying one or more orders at risk based on the predicted probabilities in real-time, wherein the identifying comprising:

tagging an order as delayed based on the probability for the first order delay, and tagging the order as severely delayed based on the probability for the second order delay;

classifying the order into one of a risk category from one or more risk categories based on the probability of one of the first order delay and the second order delay in real-time; and displaying, using visualization tool, a multi-dimensional view of order details, the predicted probabilities and the associated risk category, wherein a high-risk order is indicated in red color, a medium-risk order is indicated in amber color, and a low-risk order is indicated in green color, to facilitate the user to perform one or more actions to overcome the order delay in real-time.

* * * * *